(12) United States Patent
Duke et al.

(10) Patent No.: US 11,537,607 B2
(45) Date of Patent: *Dec. 27, 2022

(54) AUTOMATED SEQUENTIAL SITE NAVIGATION

(71) Applicant: Capital One Services, LLC, McLean, VA (US)

(72) Inventors: Robert Duke, Austin, TX (US); Ryan Engle, Austin, TX (US); Ryan Peck, Austin, TX (US); Jonathan Coon, Austin, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/326,097

(22) Filed: May 20, 2021

(65) Prior Publication Data

US 2021/0271671 A1   Sep. 2, 2021

Related U.S. Application Data

(63) Continuation of application No. 16/599,632, filed on Oct. 11, 2019, now Pat. No. 11,016,967, which is a
(Continued)

(51) Int. Cl.
*G06F 16/245* (2019.01)
*H04L 67/02* (2022.01)
(Continued)

(52) U.S. Cl.
CPC ............ *G06F 16/245* (2019.01); *G06F 16/95* (2019.01); *G06F 16/986* (2019.01);
(Continued)

(58) Field of Classification Search
None
See application file for complete search history.

(56) References Cited

U.S. PATENT DOCUMENTS

| 7,437,468 B2 | 10/2008 | Yamamoto et al. |
| 8,065,195 B2 | 11/2011 | Tarvydas et al. |

(Continued)

FOREIGN PATENT DOCUMENTS

| WO | WO 2008/121737 A1 | 10/2008 |
| WO | WO 2009/061399 A1 | 5/2009 |
| WO | WO 2017/062678 A1 | 4/2017 |

*Primary Examiner* — Uzma Alam
(74) *Attorney, Agent, or Firm* — Bookoff McAndrews, PLLC

(57) ABSTRACT

A website is navigated automatically in a sequential manner, for example by performing a series of specific network requests in a specified order, without necessarily using a browser, and without necessarily rendering each web page in the sequence. Interactions with a website are automatically recorded, stored, and analyzed. Requests and responses can be associated with particular in-put/output operations. Based on the analysis, the system can determine what data is expected by web servers, so that it can effectively simulate browser operations in connection with those web servers, and extract useful information from the data received in response to those operations. Thus, data extraction and/or other operations can be performed more efficiently and more quickly, while reducing the computing resources needed.

20 Claims, 15 Drawing Sheets

Related U.S. Application Data continuation of application No. 15/287,668, filed on Oct. 6, 2016, now Pat. No. 10,482,083.

(60) Provisional application No. 62/376,243, filed on Aug. 17, 2016, provisional application No. 62/238,565, filed on Oct. 7, 2015, provisional application No. 62/238,574, filed on Oct. 7, 2015.

(51) Int. Cl.
| | | |
|---|---|---|
| *G06F 16/95* | (2019.01) | |
| *G06F 16/958* | (2019.01) | |
| *G06Q 30/06* | (2012.01) | |
| *H04L 67/01* | (2022.01) | |
| *H04L 67/10* | (2022.01) | |
| *H04L 67/567* | (2022.01) | |
| *H04L 67/564* | (2022.01) | |
| *H04L 67/60* | (2022.01) | |

(52) U.S. Cl.
CPC ......... *G06Q 30/0629* (2013.01); *H04L 67/01* (2022.05); *H04L 67/02* (2013.01); *H04L 67/10* (2013.01); *H04L 67/564* (2022.05); *H04L 67/567* (2022.05); *H04L 67/60* (2022.05)

(56) References Cited

U.S. PATENT DOCUMENTS

| | | |
|---|---|---|
| 8,577,749 B2 | 11/2013 | Aliabadi et al. |
| 8,600,931 B1 * | 12/2013 | Wehrle ............... G06Q 10/1053 707/607 |
| 8,775,275 B1 | 7/2014 | Pope |
| 8,881,303 B2 * | 11/2014 | Liu ..................... G06F 21/00 726/28 |
| RE45,371 E | 2/2015 | Simons |
| 9,189,811 B1 | 11/2015 | Bhosle et al. |
| 9,626,688 B2 | 4/2017 | King et al. |
| 9,639,853 B2 | 5/2017 | Shiffert et al. |
| 9,766,922 B2 * | 9/2017 | Amershi ................ G06F 11/34 |
| 9,798,528 B2 * | 10/2017 | Gao ....................... G06F 8/4441 |
| 9,892,099 B2 * | 2/2018 | Cao ........................ G06F 40/14 |
| 9,953,335 B2 | 4/2018 | Shiffert et al. |
| 9,965,769 B1 | 5/2018 | Shiffert et al. |
| 2002/0087883 A1 * | 7/2002 | Wohlgemuth ............ G06F 8/65 726/29 |
| 2002/0116531 A1 * | 8/2002 | Chu ....................... G06Q 30/02 709/206 |
| 2005/0165789 A1 | 7/2005 | Minton et al. |
| 2006/0242266 A1 | 10/2006 | Keezer et al. |
| 2007/0043879 A1 * | 2/2007 | Vidya Sagar ....... G06F 16/9566 707/E17.115 |
| 2007/0180380 A1 | 8/2007 | Khavari et al. |
| 2008/0005079 A1 * | 1/2008 | Flake .................. G06F 16/9535 |
| 2008/0098300 A1 | 4/2008 | Corrales et al. |
| 2008/0189190 A1 | 8/2008 | Ferber |
| 2009/0182643 A1 | 7/2009 | Holstein et al. |
| 2010/0121810 A1 | 5/2010 | Bromenshenkel et al. |
| 2010/0241518 A1 | 9/2010 | Mccann |
| 2011/0088036 A1 * | 4/2011 | Patanella .............. G06F 9/5038 709/206 |
| 2011/0136516 A1 * | 6/2011 | Ellis ......................... H04W 4/14 455/458 |
| 2012/0198342 A1 * | 8/2012 | Mahmud .................. G06F 8/30 715/733 |
| 2012/0265637 A1 | 10/2012 | Moeggenberg |
| 2013/0151381 A1 | 6/2013 | Klein |
| 2013/0191723 A1 | 7/2013 | Pappas et al. |
| 2014/0100991 A1 * | 4/2014 | Lenahan ............ G06Q 10/0833 705/26.7 |
| 2014/0229258 A1 * | 8/2014 | Seriani ............. G06Q 10/06311 705/14.23 |
| 2014/0229335 A1 * | 8/2014 | Chen ................. G06Q 30/0269 705/26.61 |
| 2014/0244429 A1 * | 8/2014 | Clayton ............. G06Q 30/0631 705/26.7 |
| 2014/0281918 A1 * | 9/2014 | Wei ......................... H04L 67/56 715/234 |
| 2016/0063595 A1 | 3/2016 | Oral et al. |
| 2016/0191351 A1 * | 6/2016 | Smith .................... H04L 67/10 709/219 |
| 2017/0103102 A1 | 4/2017 | Alison et al. |
| 2017/0171311 A1 * | 6/2017 | Tennie .................... H04L 67/01 |
| 2017/0277764 A1 * | 9/2017 | Osotio .................... G06T 19/20 |
| 2018/0089737 A1 * | 3/2018 | Ali ..................... G06Q 30/0255 |

* cited by examiner

5501 AIRPORT BLVD
AUSTIN, TX 78751-1410
United States
5126402100
Edit

New REI membership

Buy a lifetime membership for a one-time fee of $20. REI member benefits include an annual refund of up to 10% back, exclusive member deals and more.

☐ Add a $20 membership

Current REI membership

Add your number to this order to receive your member benefits. Forgot member number?

Member number [ ] Apply

Payment method

Coupon code
[IVTESTCOUPON] Apply
⊗ Invalid coupon entered: IVTESTCOUPON ← 411

Gift Card

Number [ ] PIN ⓘ [ ] Apply

Credit Card

---

402 →

| rei.com | ← 403 |
| STOP RECORDING | ← 405 |
| 207 requests recorded | |
| Mark Requests | |
| ATC | ← 406A |
| PRICING | ← 406B |
| COUPON | ← 406C |
| CLEARCART | ← 406D |
| Output Information | |
| 100.00 | ← 407A |
| 8.25 | ← 407B |
| Standard | ← 407C |
| FREE | ← 407D |
| 108.25 | ← 407E |

FIG. 8

Hedgehog

Load Requests: [Choose File] recording.hog　　Force HTTPS ☐　[EXPORT]

▷ SITE META

▽ FILTERS

☑ Filter analytics　☑ Filter assets　☑ Filter scripts

☐ Filter by Customer Tags　☐ Filter by Request Tags　☐ Filter by Output Tags rei.com Filter Request Find Request Find Response

▷ CUSTOMER KEYS ☑

▷ OUTPUT KEYS ☑

▷ REQUEST KEYS ☑

▷ SELECTED REQUESTS　0

▽ ALL REQUESTS

▷ ATC

▷ PRICING

▷ COUPON

▷ CLEARCART

*FIG. 12*

AUTOMATED SEQUENTIAL SITE NAVIGATION

CROSS-REFERENCE TO RELATED APPLICATIONS

The present application is a continuation of U.S. patent application Ser. No. 16/599,632, filed Oct. 11, 2019, which is a continuation of U.S. patent application Ser. No. 15/287,668, filed Oct. 6, 2016, issued as U.S. Pat. No. 10,482,083 B2, issued Nov. 19, 2019, which claims the benefit of U.S. Provisional Application No. 62/238,565, entitled "Browserless Extraction of Data from Web Pages," filed Oct. 7, 2015.

U.S. patent application Ser. No. 15/287,668, filed Oct. 6, 2016, to which this application also claims priority, further claims the benefit of U.S. Provisional Application No. 62/238,574, entitled "Automated Browserless Sequential Site Navigation," filed Oct. 7, 2015.

U.S. patent application Ser. No. 15/287,668, filed Oct. 6, 2016, to which this application also claims priority, further claims the benefit of U.S. Provisional Application No. 62/376,243, entitled "Automated Testing of Multiple On-Line Coupons," filed Aug. 17, 2016.

U.S. patent application Ser. No. 15/287,668, filed Oct. 6, 2016, to which this application also claims priority, is related to U.S. patent application Ser. No. 14/933,173, entitled "Universal E-Universal Electronic Shopping Cart," filed Nov. 5, 2015.

U.S. patent application Ser. No. 15/287,668, filed Oct. 6, 2016, to which this application also claims priority, is related to U.S. patent application Ser. No. 15/287,089, entitled "Automated Extraction of Data from Web Pages," filed on Oct. 6, 2016.

All the above-mentioned applications are incorporated by reference herein in their entirety.

TECHNICAL FIELD

The present document relates to automated sequential site navigation that can be performed without a browser.

DESCRIPTION OF THE RELATED ART

Some websites, such as Google Shopping, allow customers to comparison shop, by providing pricing and other information from multiple merchants. The customer can then click on a link to be taken to a particular merchant's website so as to purchase the item there. Other websites, such as Amazon, act as a storefront and/or marketplace wherein customers can buy items from different merchants; in some cases, the website operator fulfills the order on behalf of the merchant.

Related U.S. Utility application Ser. No. 14/933,173 for "Universal E-Universal Electronic Shopping Cart", filed Nov. 5, 2015, describes a buying engine that provides a universal e-shopping cart regardless of where the customer shops. The customer may shop at whichever online merchant(s) he or she likes to shop, using any suitable client device and software, for example by using a browser or app to shop for items at various websites. When the customer is interested in an item at a website of a merchant, he or she clicks on an "Add to Cart" (ATC) button as normal. The system intercepts the ATC request and automatically determines which merchant (of all known merchants) is deemed to be the best choice for purchase of the identified item. The item can then be purchased from that merchant, either automatically (via the universal e-shopping cart) or by redirection to the merchant's web page, or by some other means.

In such contexts, as well as in other contexts, it is useful to obtain information about pricing and availability for items at various e-commerce sites. Existing techniques for obtaining information from websites can include the use of an API to automatically interact with the website, and/or "scraping" techniques to obtain information from rendered web pages. Both of these techniques are deficient, in that they require the cooperation of the website from which the data is to be obtained, and/or they require rendering of web pages which can be computationally expensive and can consume bandwidth. In addition, such techniques are inefficient when information describing multiple configurations of a product (such as different sizes or colors) is to be obtained, as such operations typically require multiple requests or scrapes.

SUMMARY

Various embodiments provide techniques for automatically navigating a website in a sequential manner. In at least one embodiment, such automated navigation can be performed to obtain information about pricing and availability for items at various e-commerce sites, or to perform other operations such as automated purchases. As described herein, automated sequential site navigation can include performing a series of specific network requests in a specified order, without necessarily using a browser, and without necessarily rendering each web page in the sequence. Thus, data extraction and/or other operations can be performed more efficiently and more quickly, while reducing the computing resources needed.

In at least one embodiment, an initial recording step is performed, in which interactions with a website are automatically recorded, stored, and analyzed. Requests and responses can be associated with particular input/output operations. Based on the analysis, the system can determine what data is expected by web servers, so that it can effectively simulate browser operations in connection with those web servers, and extract useful information from the data received in response to those operations.

The techniques described herein can be implemented, for example, to extract information from an e-commerce website, even when such extraction involves multiple requests in a specified sequence, and even when the e-commerce website has not shared an API with the system. In one example, product data can be extracted, including product variants such as color, size, width and availability, without having to load the entire web page in a browser. One skilled in the art will recognize that, although the system and method are described herein in such an e-commerce environment, the techniques can be applied to any other context.

The techniques described herein take advantage of the fact that, for many tasks, such as application filing, e-commerce checkouts, signup flows and web crawling, many assets normally rendered on a web page (and transmitted between client and server) are not needed. This includes assets such as, for example, HTML, CSS, JavaScript, images, and the like, as well as AJAX GETs and POSTs used to retrieve or update the state of the server. In particular, when a machine is performing navigation to perform such tasks by interacting in an automated fashion with a website, only a handful of mandatory requests may be needed to navigate the multi-page flow and achieve the desired outcome. Techniques described herein provide mechanisms for identifying key data, so as to preserve such flow, while avoiding the need to transmit and receive the remain requests that are normally transmitted and received while navigating the same flow through the use of a browser.

Various embodiments described herein drastically reduce the number of requests between server and client, and speed up completion of an application flow on the Internet, by identifying key network requests and swap-ping out the necessary bits of data in the request in order to automate and run a flow without the use of a browser.

In at least one embodiment, such operations can be performed by a software and/or hardware component at a client or server. Any suitable device can be used, such as a computer, smartphone, kiosk, laptop, personal digital assistant, or other device.

A browser need not be installed or used. However, one skilled in the art will recognize that in at least one embodiment the techniques described herein can be implemented in a browser. For example, a browser can be configured to perform automated extraction as described herein, without necessarily rendering pages in visible form for output.

Further details and variations are described herein.

BRIEF DESCRIPTION OF THE DRAWINGS

The accompanying drawings, together with the description, illustrate several embodiments. One skilled in the art will recognize that the particular embodiments illustrated in the drawings are merely exemplary, and are not intended to limit scope.

FIGS. 4 through 11 are screen shots depicting an example in which a checkout process is recorded, according to one embodiment.

FIG. 12 depicts an example of a user interface for an analysis tool to interpret and filter the recorded results, according to one embodiment.

DETAILED DESCRIPTION

The various concepts, architectures, methods, and modes of operation described herein are intended as illustrative examples that can be implemented singly or in any suitable combination with one another. Some may be omitted and others included, as suitable for various embodiments. Accordingly, the following description and accompanying Figures merely set forth a subset of the possible embodiments, and are not intended to limit scope.

System Architecture

According to various embodiments, the system can be implemented on any electronic device or devices equipped to receive, store, and present information. Such electronic devices may be, for example, desktop computers, laptop computers, smartphones, tablet computers, smart watches, wearable devices, or the like.

Although the system is primarily described herein in connection with an implementation in a client/server context wherein the client is a computer, smartphone, tablet, or similar device, one skilled in the art will recognize that the techniques described herein can be implemented in other contexts, and indeed in any suitable device capable of receiving and/or processing user input, and/or communicating with other components over an electronic network. Accordingly, the following description is intended to illustrate various embodiments by way of example, rather than to limit scope.

Figure 1:
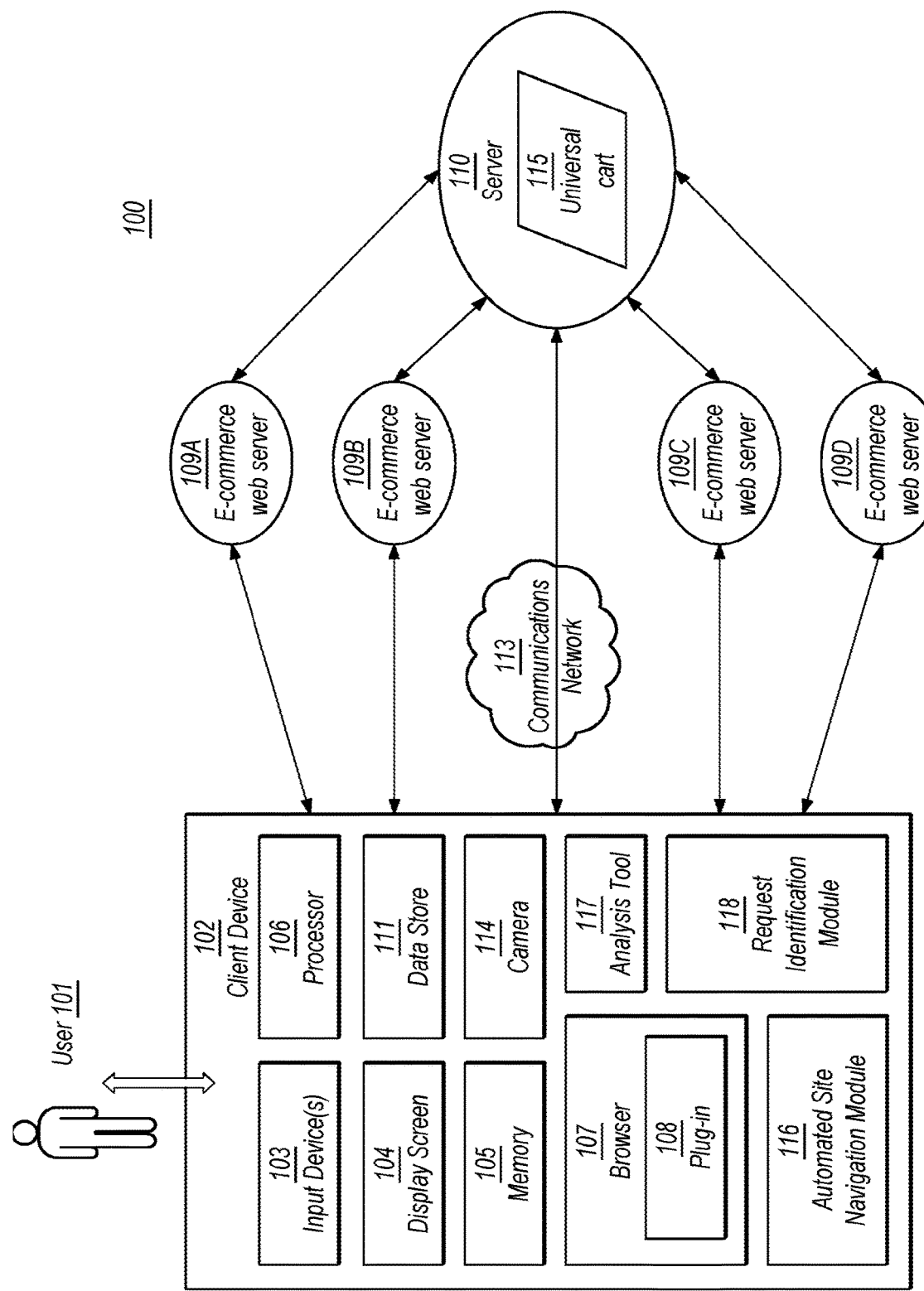
FIG. 1 is a block diagram depicting a system for implementing automated sequential site navigation according to one embodiment.

Referring now to FIG. 1, there is shown a block diagram depicting a system 100 for implementing the techniques described herein according to one embodiment. As shown in FIG. 1, in at least one embodiment, the system is implemented in a client/server environment wherein client device 102 can send and receive communications with any number of e-commerce website servers 109 via communications network 113. In at least one embodiment, server 110 can also be provided to implement universal cart 115, although such functionality is not required in order to implement the techniques described herein. Server 110, if provided, receives and responds to requests from client device 102.

Client device 102 may be any electronic device equipped to receive, store, and/or present information, and to receive user input in connect with such information, such as a desktop computer, laptop computer, personal digital assistant (PDA), cellular telephone, smartphone, music player, handheld computer, tablet computer, kiosk, game system, smart watch, wearable device, or the like. In at least one embodiment, client device 102 has a number of hardware components well known to those skilled in the art. Input device(s) 103 can be any element or elements capable of receiving input from user 101, including, for example, a keyboard, mouse, stylus, touch-sensitive screen (touchscreen), touchpad, trackball, accelerometer, five-way switch, microphone, or the like. Input can be provided via any suitable mode, including for example, one or more of: pointing, tapping, typing, dragging, and/or speech.

Processor 106 can be a conventional microprocessor for performing operations on data under the direction of software, according to well-known techniques. Memory 105 can be random-access memory, having a structure and architecture as are known in the art, for use by processor 106 in the course of running software.

Browser 107 is an example of a software application that can be used by user 101 to access and interact with websites over communications network 113. In at least one embodiment, user 101 can view and interact with e-commerce web servers 109 via browser 107, for example by clicking on links to view items and to place items in a shopping cart. In other embodiments, any suitable app (software application) or other component can be used in place of browser 107.

In at least one embodiment, browser 107 includes plug-in 108 (or browser extension) which performs certain functions in connection with the system and method described herein. For example, as described in more detail below, in at least one embodiment, plug-in 108 records requests made during interactions between browser 107 and web servers 109 (and/or between browser 107 and server 110). Alternatively, such operations can be performed by another component that need not be a part of browser 107. In at least one embodiment, plug-in 108 or some other software application runs in the background no matter what browser or application user 101 is running. The background application can thereby see and record any relevant interactions with websites run by web servers 109, regardless of which software is being used to perform the interactions.

In at least one embodiment, client device 102 also runs analysis tool 117, which is used to interpret and filter the recorded interactions with web pages run by web servers 109. Analysis tool 117 can run on another device, such as server 110 or any other client device communicatively coupled to server 110.

In at least one embodiment, client device 102 also runs request identification module 118, which is used to review recorded requests and identify those that are necessary to complete process flow. Request identification module 118 can run on another device, such as server 110 or any other client device communicatively coupled to server 110.

In at least one embodiment, client device 102 also runs automated site navigation module 116, which is able to automatically extract information from various websites (such as those run by web servers 109) without the need for rendering on a browser. In at least one embodiment, module 116 operates using information generated by analysis tool 117, based on recorded interactions with web pages run by web servers 109. In at least one embodiment, automated site navigation module 116 can function on a device 102 that also runs browser 116; alternatively, module 116 can be implemented on a separate device that does not run a browser. In at least one embodiment, module 116 operates without any need for human interaction.

As depicted and described herein, components 116, 117, and 118 can be implemented as software running on processor 106. However, these components need not be implemented as separate modules, and can instead be part of a single software application. Alternatively, some or all of these components can run on devices other than client device 102. Alternatively, these components can be implemented as hardware, or they can be omitted, with their functionality assigned to other components.

Display screen 104 can be any element that graphically displays information such as items presented by browser 107, user interface elements, and/or the like. Such output may include, for example, descriptions and images depicting items that user 101 places in a shopping cart, navigational elements, search results, pricing and shipping information, graphical elements, forms, or the like. In at least one embodiment where only some of the desired output is presented at a time, a dynamic control, such as a scrolling mechanism, may be available via input device 103 to change which information is currently displayed, and/or to alter the manner in which the information is displayed.

In at least one embodiment, the information displayed on display screen 104 may include data in text and/or graphical form.

Data store 111 can be any magnetic, optical, or electronic storage device for data in digital form; examples include flash memory, magnetic hard drive, CD-ROM, DVD-ROM, thumbdrive, or the like. Data store 111 may be fixed or removable.

In at least one embodiment, device 102 can include additional components. For example, a camera 114 can be included, as is well known for devices such as smartphones. Camera 114 is optional and can be omitted.

Additional input mechanisms, sensors, and/or devices can also be included in device 102, such as a speaker (for voice commands), accelerometer (to detect shaking and changes in position or orientation), GPS sensor (to detect location), and/or the like.

As mentioned above, FIG. 1 depicts an example of a system implementation in a client/server environment. An example of such a client/server environment is a web-based implementation, wherein client device 102 runs automated site navigation module 116 that automatically interacts with web pages and/or other web-based resources from e-commerce web servers 109. Information, images, and/or text from websites of e-commerce web servers 109 can be transmitted to module 116 as part of such web pages and/or other web-based resources, using known protocols and languages such as Hypertext Markup Language (HTML), Java, JavaScript, and the like. In addition, such information images, and/or text from websites of e-commerce web servers 109 can be presented in browser 107, or in some other software application (app) or other component running on client device 102, as part of user interactions with websites of e-commerce web servers 109. As described in more detail below, plug-ins 108 can record such interactions.

Any suitable type of communications network 113, such as the Internet, can be used as the mechanism for transmitting data among client device 102, server 110, and web servers 109, according to any suitable protocols and techniques. In addition to the Internet, other examples include cellular telephone networks, EDGE, 3G, 4G, long term evolution (LTE), Session Initiation Protocol (SIP), Short Message Peer-to-Peer protocol (SMPP), SS7, Wi-Fi, Bluetooth, ZigBee, Hypertext Transfer Protocol (HTTP), Secure Hypertext Transfer Protocol (SHTTP), Transmission Control Protocol/Internet Protocol (TCP/IP), and/or the like, and/or any combination thereof. Communications network 113 can be wired or wireless, or any combination thereof. Communications across network 113 can be encrypted or unencrypted. In at least one embodiment, client device 102 transmits requests for data via communications network 113, and receives responses from server 110 and/or e-commerce web servers 109 containing the requested data.

In at least one embodiment, some components of system 100 can be implemented as software written in any suitable computer programming language. Alternatively, such components may be implemented and/or embedded in hardware.

As described in more detail below, in at least one embodiment, plug-in 108 (or other software) records interactions between browser 107 and websites of e-commerce web servers 109, and/or between browser 107 and server 110 containing universal cart 115. Recorded interactions, or data extracted therefrom, are stored in data store 111 or elsewhere. Automated site navigation module 116 then uses such recorded information to automatically navigate websites of e-commerce web servers 109 without the need for human interaction, so as to extract useful information from such websites.

As depicted in FIG. 1, in at least one embodiment, the system can be implemented in connection with a server 110. Server 110 can operate a universal cart 115; items are added to universal cart 115 according to techniques described in related U.S. Utility application Ser. No. 14/933,173 for "Universal E-Universal Electronic Shopping Cart", filed Nov. 5, 2015, the disclosure of which is incorporated by reference herein. However, universal cart 115 is optional and need not be included to implement the techniques discussed herein. In addition, universal cart 115 is not necessarily a physical component of server 110, but is, in at least one embodiment, a data structure or dataset that can be stored in a database or other suitable storage architecture on an electronic storage device. Universal cart 115 need not be maintained at server 110 itself, but can be maintained at another component to which server 110 has access, such as a separate server or data storage device. Additional details concerning the structure and organization of server 110, and the operation of universal cart 115, are described in the above-referenced related application.

In another embodiment, as discussed in the above-referenced related application, the functionality for recording interactions with web server 109 and for performing automated sequential site navigation can be built into browser 107 itself, or into an operating system running at client device 102. Alternatively, such functionality can be implemented as a separate software applications (app) running on device 102.

In another embodiment, server 110 can be omitted entirely, and the described system can be implemented as a technique to perform automatic website navigation without the use of a server 110. Indeed, in at least one embodiment, the described system can be implemented entirely within one or more client device(s) 102.

Method

Figure 2:
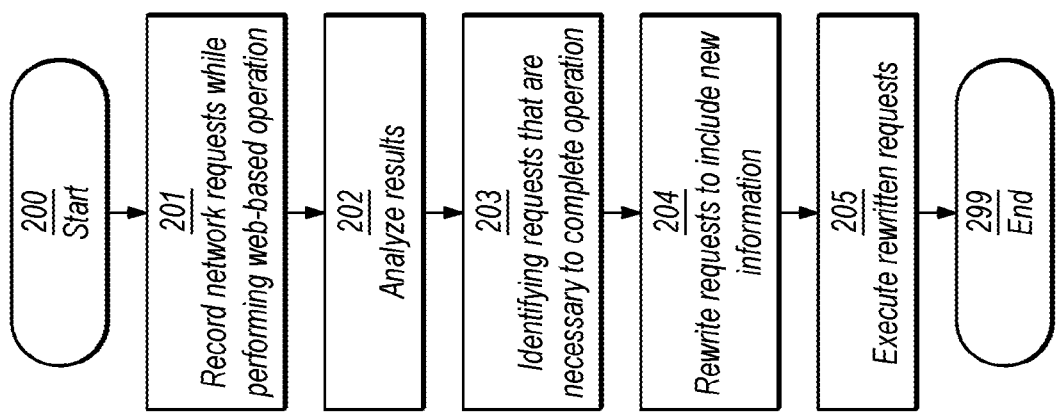
FIG. 2 is a flowchart depicting an overall method for automated sequential site navigation according to one embodiment.

Referring now to FIG. 2, there is shown a flowchart depicting a method for implementing automated sequential site navigation according to one embodiment. Although described herein in terms of tangible goods, the system and method can be implemented for any type of online purchases, including for example services, travel, event tickets, media and entertainment content, and/or the like.

In at least one embodiment, the method depicted in FIG. 2 can be performed using the architecture depicted in FIG. 1. However, one skilled in the art will recognize that the method can be performed using other architectures and arrangements. In at least one embodiment, the method of FIG. 2 can be implemented on any client device(s) 102 or other device(s) capable of interacting with web server(s) 109.

In at least one embodiment, the system records 201 all network requests made while performing a web-based operation that involves multiple steps, such as checking out on a website of an e-commerce web server 109. In at least one embodiment, the stored records of network requests are analyzed, such as by automated analysis tool 117 that can be implemented as a web-based application or in some other manner, either on client device 102 or on some other device.

In at least one embodiment, recording step 201 is performed by plug-in 108 or other software component that monitors and records interactions between client device 102 and websites of e-commerce web servers 109, as initiated by user 101 using browser 107. Alternatively, plug-in 108 can record 102 interactions that take place automatically, for example by "bots" interacting with web servers 109. By recording exactly what information was entered during checkout operations and/or other interaction(s) with websites of e-commerce web servers 109, the system is able to determine which requests contain which information, and to swap the information in each request for a key that can be referenced for future requests. Analysis tool 117 analyzes 202 the results of the recording, so as to determine how the data was encoded in the form. This allows substitute data to be encoded in the same way when formulating new requests. Once information has been found in a request, the same information can be searched for in all previous responses. Information in requests can come from a number of sources, including for example response HTML, cookies, formData within HTML, XML, JSON and/or plain text. In at least one embodiment, applied encryption can be reverse-engineered, particularly if it takes place at client device 102.

In at least one embodiment, once all requests have been made in the correct sequence, analysis tool 117 can automatically extract the relevant data (such as subtotal, shipping options, tax, discounts, fees and total for an ecommerce transaction) by entering values ahead of time and automatically generating a parser to extract the data from the responses that contain the correct values.

In at least one embodiment, coupons for use in ecommerce sites can be tested, for example by running through checkout in parallel, one for each coupon code, and one without a coupon code. This results in the checkout process taking roughly the same amount of time as it would to test a single coupon code, and adds the ability to try any number of coupons without significantly in-creasing processing time.

In at least one embodiment, after pricing information has been extracted, contents of the cart are cleared, so that any items added to the cart are returned back to the retailer's inventory and are not held unnecessarily.

Based on the analysis performed in step 202, request identification module 118 (or some other component) identifies 203 those requests that are necessary to complete the operation, by determining which requests are sending required data for completing e-commerce-related tasks. Once such requests have been identified, the system can rewrite 204 requests as needed to include new information; for example, a new address or a different coupon code can be substituted for previous data, thus allowing for automated site navigation. Automated site navigation module 116 then executes 205 the rewritten requests, for example by transmitting the rewritten requests to web server(s) 109, and receiving and interpreting the responses. An example of this might be changing the address to an address in a different state and reading the response that includes the tax rate for that state, or changing the request to try a different coupon and read the total in the response to determine whether the coupon changed the price. In at least one embodiment, this process can be run without the use of a browser, for example by keeping track of recorded cookies during normal website interaction, and passing such recorded information from one request to the next.

In at least one embodiment, results of analysis step 202 are made available to other client devices 102, so that multiple client devices 102 can rewrite their requests using the data collected from one client device 102. In at least one embodiment, data collected from analysis step 202 performed at multiple client devices 102 can be combined, so as to provide more effective, reliable, and accurate aggregate data for rewriting requests. Any suitable means can be used for sharing such data among devices 102; these include peer-to-peer approaches, where data is sent directly from one device to another, as well as centralized approaches, where data is stored at a central server (such as server 110) and retrieved by client devices 102 as needed. This approach is particularly useful in cases where a site is A/B testing checkout flows. By reviewing requests made by a client within the A test and other requests within the B test, it is possible to automatically determine whether the test will affect the results, and if so, what data is the same or different within the requests to support both flows.

Recording Step 201

Figure 3:
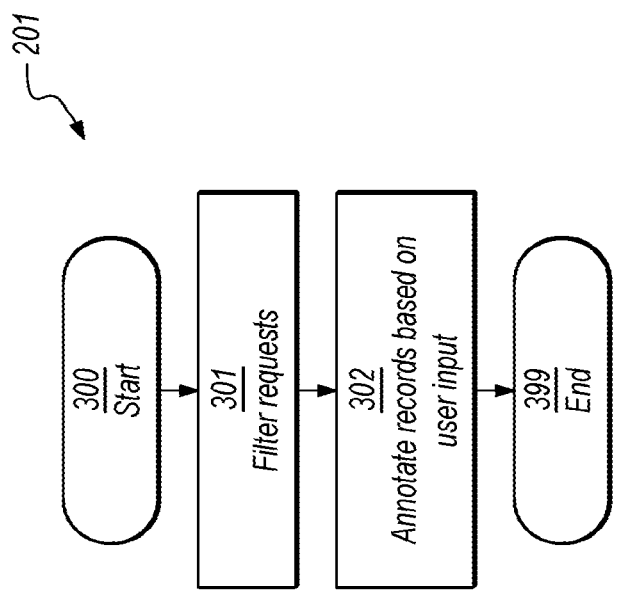
FIG. 3 is a flowchart depicting a method for recording requests made during interaction with a website using a browser, according to one embodiment.

Referring now to FIG. 3, there is shown a flowchart depicting a method of recording 201 all of the requests being made during typical interaction with a website of an e-commerce web server 109 using browser 107. Recording 201 can be done with a utility such as a browser extension or plug-in 108 that is able to view all requests and responses being made by browser 107.

In at least one embodiment, requests can be filtered 301 in order to cut down on the content being produced. Filtering out images and CSS helps reduce the size, while having little impact on completing the flow. By default, it is generally useful to exclude any requests that are purely media or styling, such as CSS, images, videos, or pure text files. On the other hand, it is often useful to identify requests that contain JSON. In at least one embodiment, the type of request and type of response are determined by reviewing the request and response headers, which contain a content-type field, which can be used to filter unnecessary requests.

In at least one embodiment, during the recording of requests, annotations can be made 302 to keep track of information that may help determine which requests contain what information. For example, it may be useful to receive input indicating the subtotal, tax, shipping cost and speed, as well as grand total, during a checkout flow, in order to automatically tag those requests that return those specific data items. In at least one embodiment, annotation 302 is performed based on user input indicating what information is currently displayed on the web page, or what information was entered by the user. Alternatively, annotation 302 can be performed based on automatically derived information, e.g. by scraping or by other means.

For example, in at least one embodiment, annotations can be made 302 to track input information, such as first name, last name, address, and any other dynamic information that can be used to identify requests that send that content. Depending on the flow, it may be useful to swap out some content with new content in order to complete the flow with different information; annotations from step 302 can help to identify which content is to be swapped out.

Example of Recording

Referring now to FIGS. 4 through 12, there are shown screen shots depicting an example in which a checkout process is recorded, as described in step 201 above, according to one embodiment. Similar techniques can be used to record other types of website interactions. In each of FIGS. 4 through 12, the left side is a display of a web page 401 of an e-commerce website, shown during the recording process. The right side is a user interface 402 that enables control of the recording process, as provided for example by a browser extension or plug-in 108. The depicted layout is merely exemplary, however.

In the following description, user 101 refers to the individual controlling or administering the recording process. In at least one embodiment, such process can be performed automatically, with little or no human interaction; alternatively, a human can be in control of the process. Typically, user 101 controlling or administering the recording process is a different person than an ordinary customer of the website, though this may or may not be the case.

Figure 4:
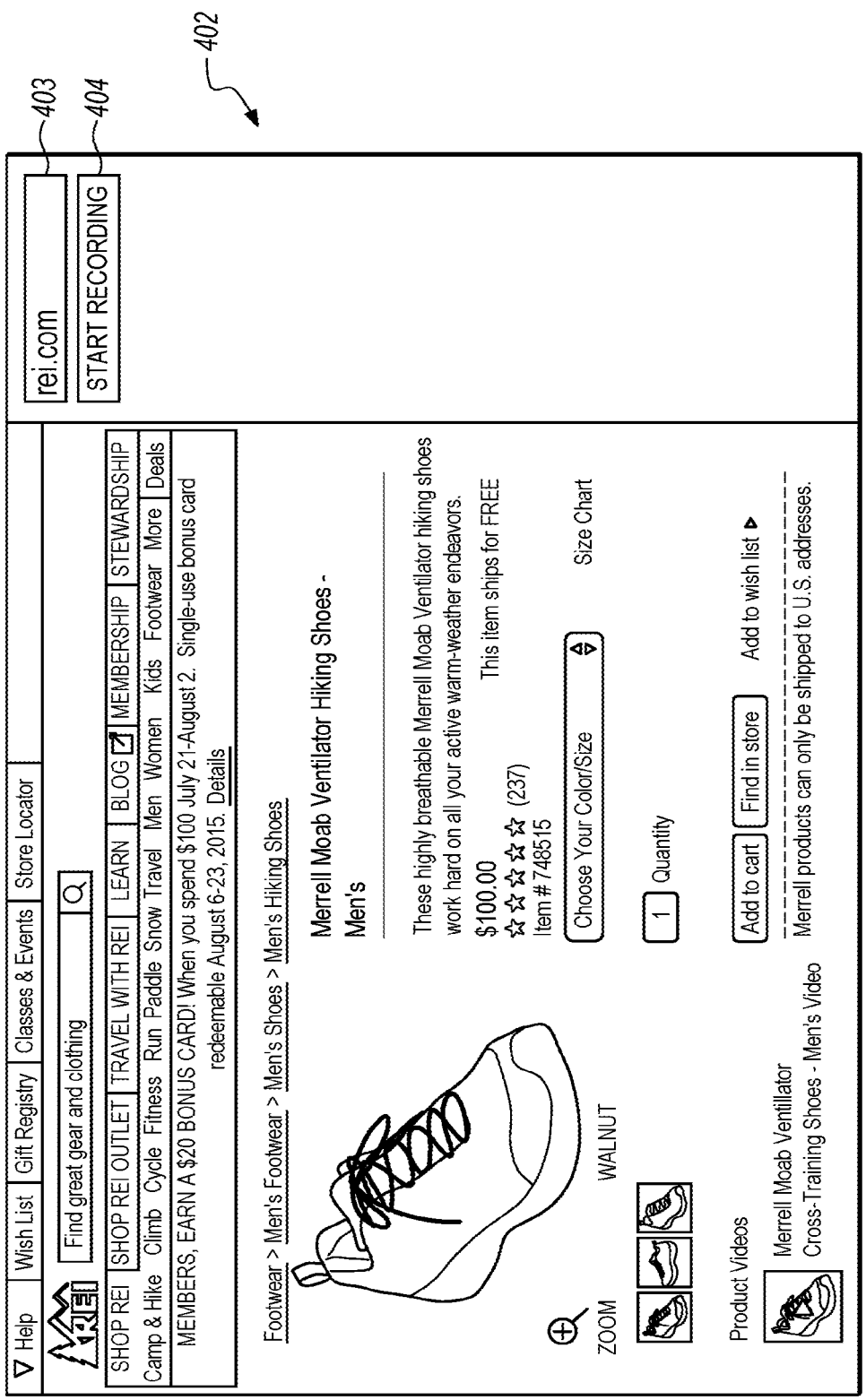

In FIG. 4, user 101 enters the URL of the website to be recorded in field 403, and clicks "Start Recording" button 404. The system then begins recording 201 network requests, as described above in connection with FIG. 2.

Figure 5:
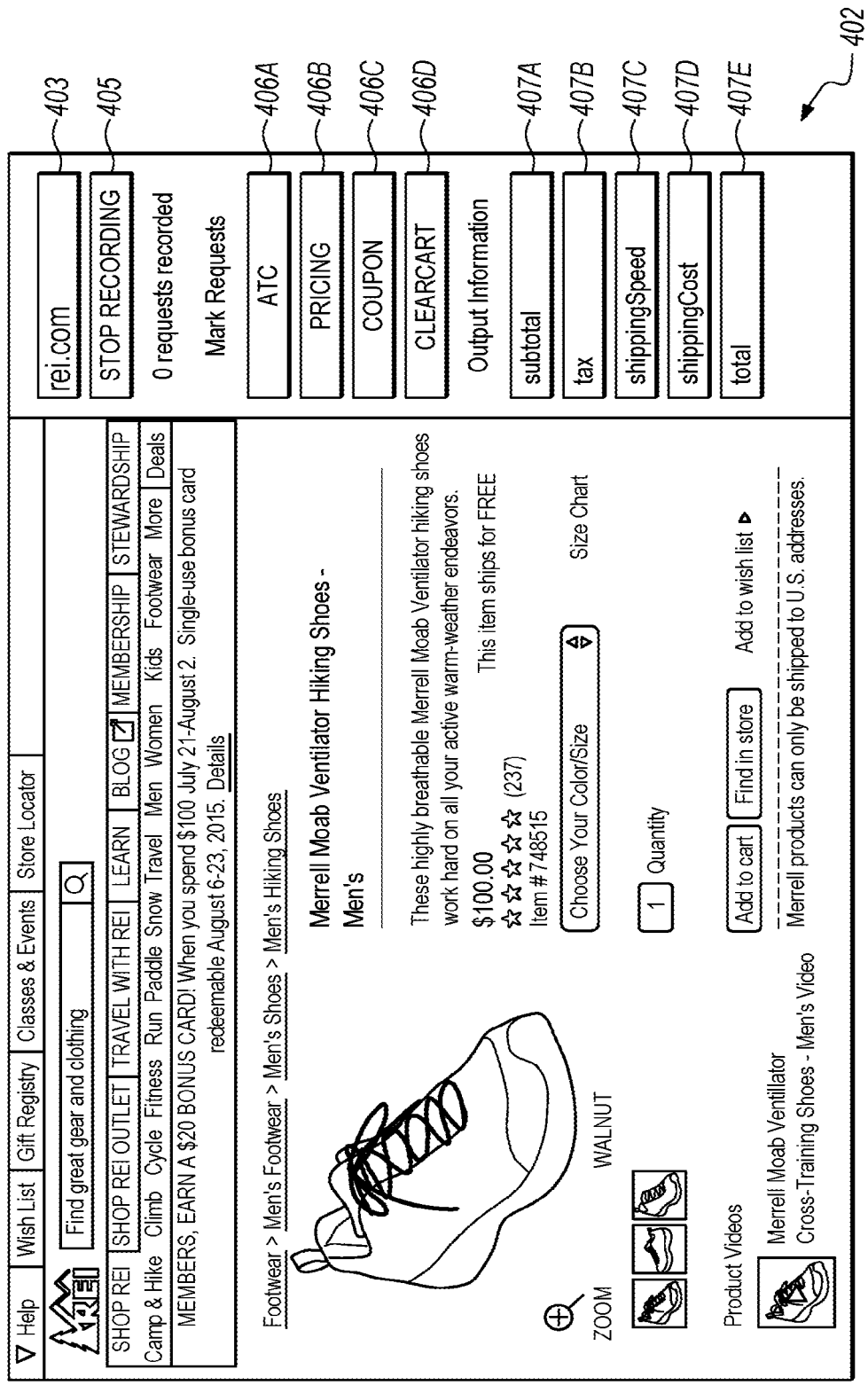

In FIG. 5, recording 201 of the interaction with web page 401 is proceeding. All requests to the web server 109 of the associated website, and responses received from the web server 109 of the associated website, are recorded. "Stop Recording" button 405 is shown, allowing user 101 to stop the recording. Additional buttons 406 are provided, such as "ATC" button 406A, "Pricing" button 406B, "Coupon" button 406C, "ClearCart" button 406D, and the like, to allow user 101 to denote different requests as belonging to a particular type, based on the interaction that is taking place when the request is performed; this allows requests to be grouped together, and makes it easier to categorize and find specific requests later. Alternatively, such categorization can be performed automatically. Fields 407 are provided for user 101 to enter output information displayed on web page 401, as described in more detail below.

Figure 6:
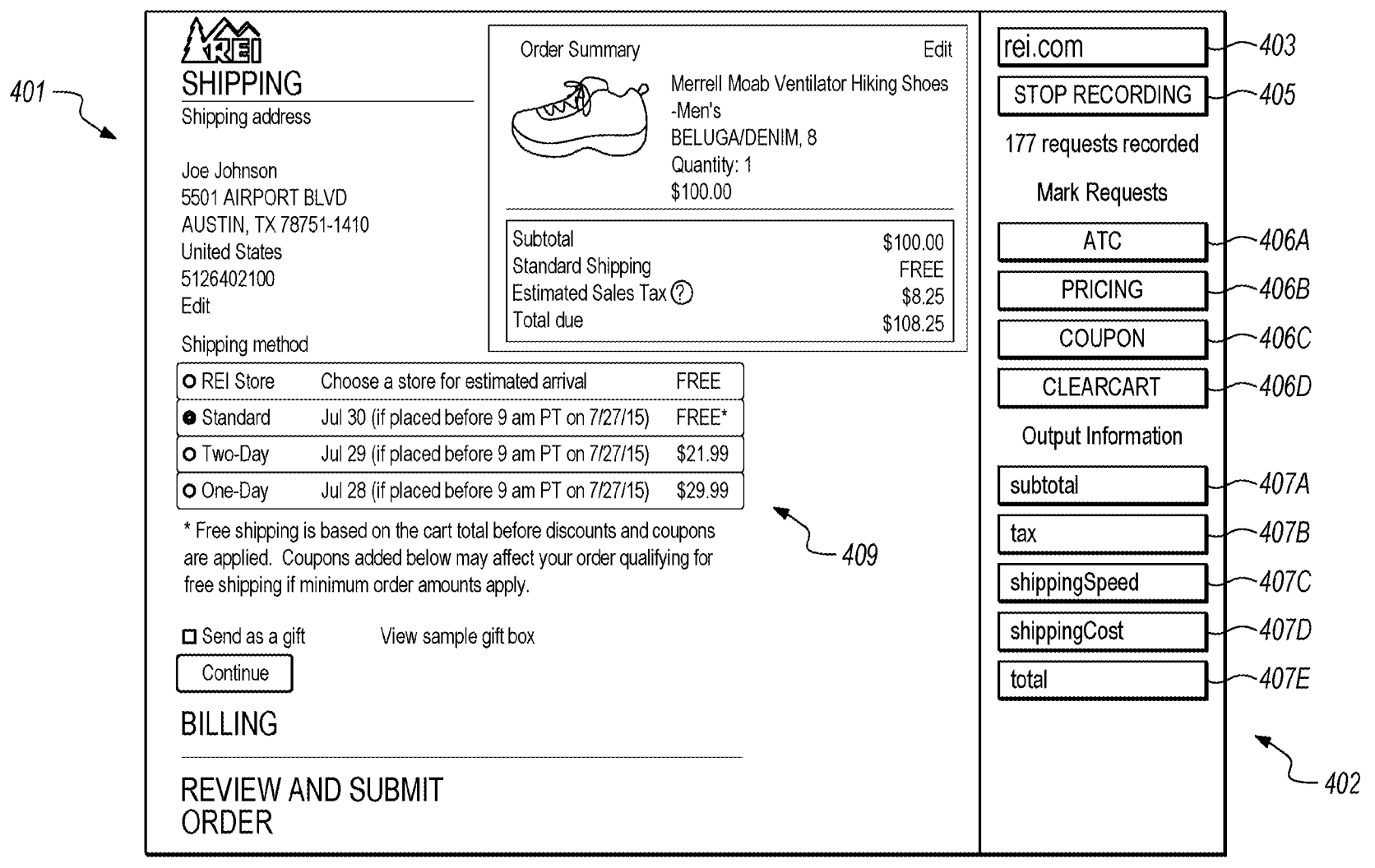

In FIG. 6, 177 requests have been recorded. Here, user 101 clicks on "Pricing" button 406B to indicate to the system that, at this point in the flow, pricing information 409 is visible on web page 401. As can be seen in the Figure, "ATC" button 406A has also been clicked, to indicate that an item has been added to user's 101 shopping cart. In this manner, the information just received from web server 109 can be properly categorized as pricing information. As mentioned above, in at least one embodiment, such categorization can be automatic, without requiring user 101 to manually identify the type of information currently being displayed. Such automatic categorization can be based on analysis of the displayed data, scraping, and/or on other factors.

Figure 7:

In FIG. 7, user 101 has entered output information in fields 407, such as pricing in field 407A, tax in field 407B, shipping speed in field 407C, shipping cost in field 407D, and total amount in field 407E. User 101 enters this information based on what is seen on web page 401 itself, in order summary 410. In at least one embodiment, the system uses this information as entered by user 101 in fields 407, in order to determine exactly which request produced the specified values.

In FIG. 8, user 101 has entered an invalid coupon code, namely IVTESTCOUPON, as indicated by message 411. User 101 clicks "Coupon" button 406C, so as to indicate that a coupon code has been entered. In at least one embodiment, the system can thereby record and identify those interactions that take place upon entry of a coupon code, whether valid or invalid.

Figure 9:
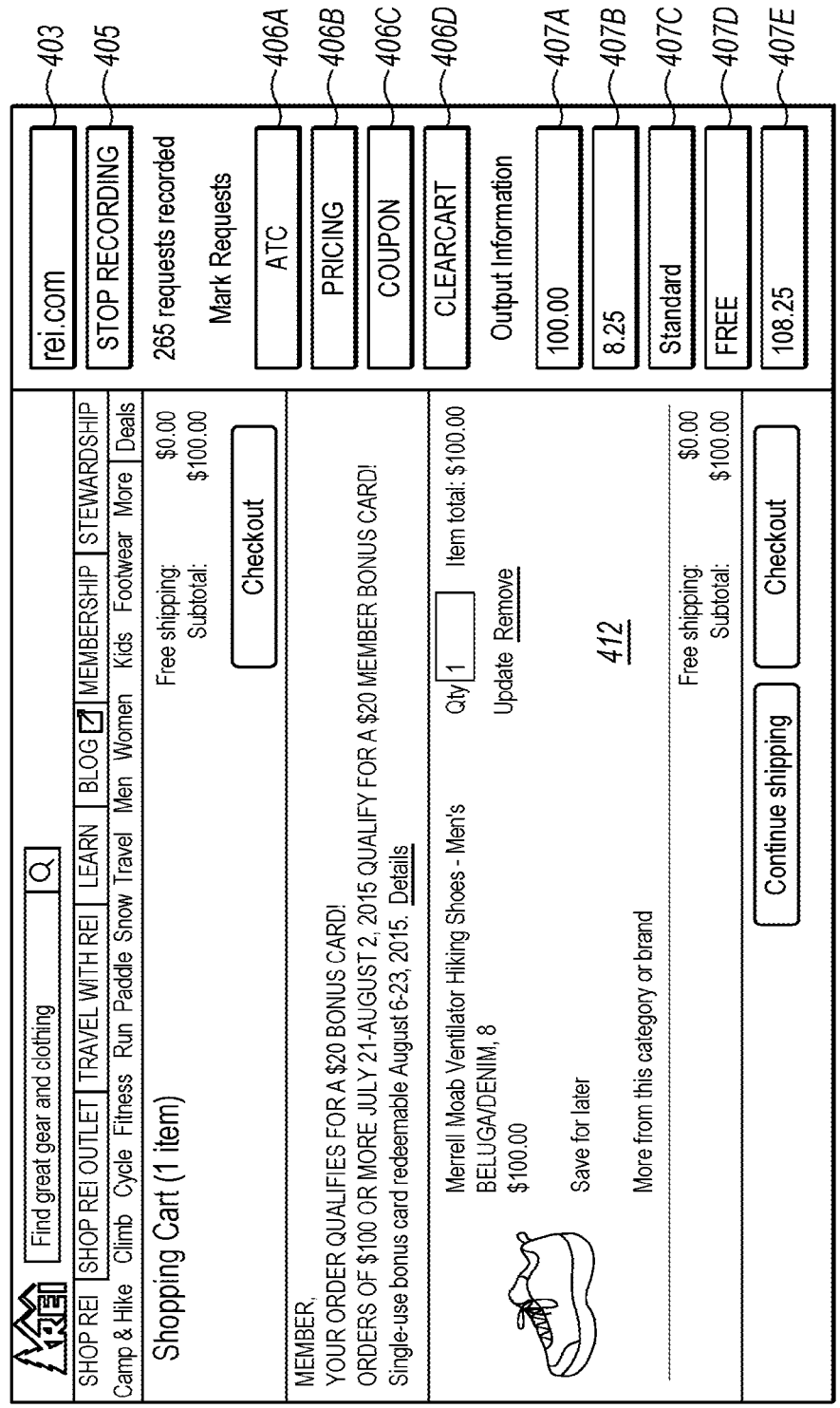
Figure 10:
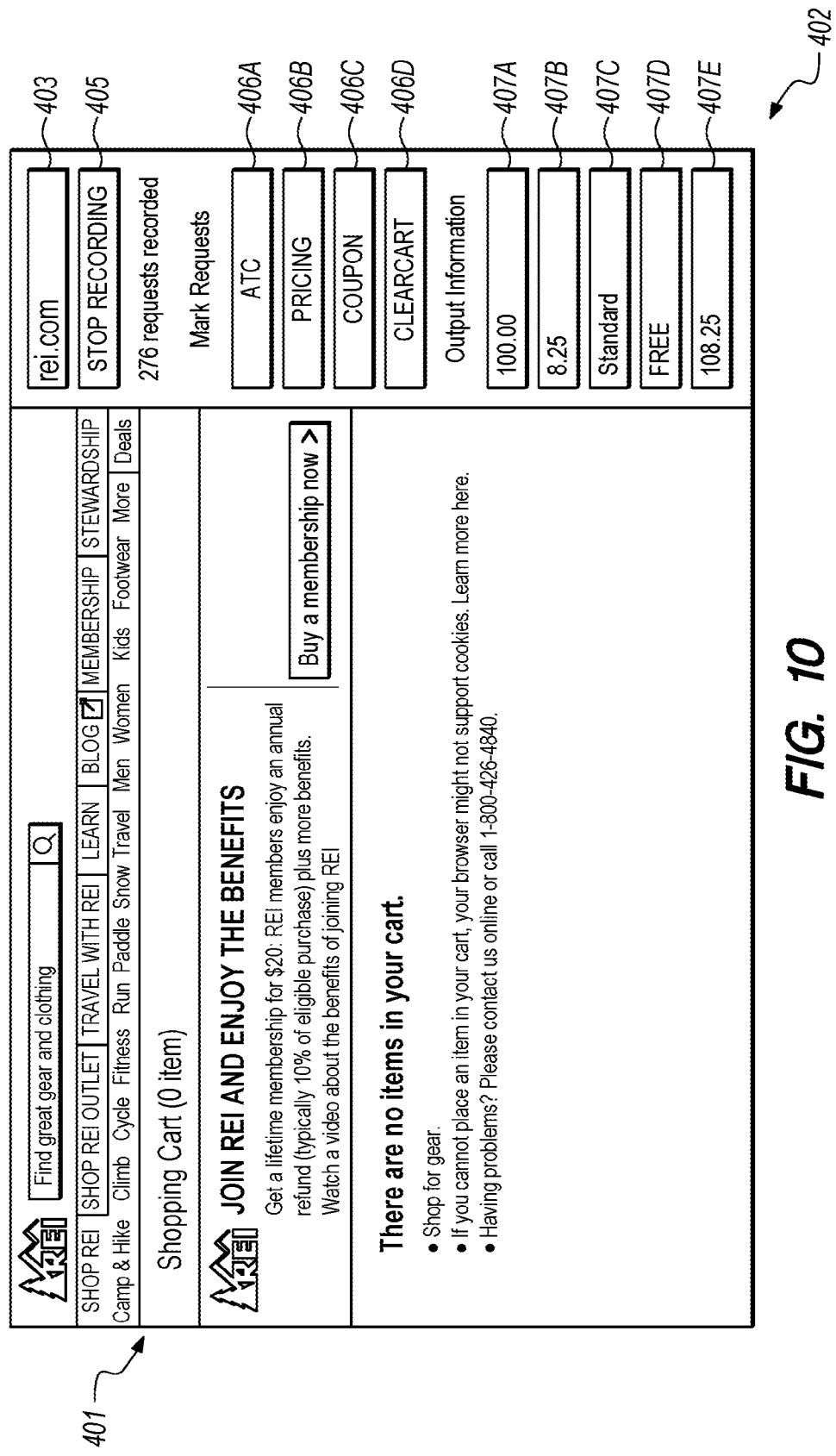

FIGS. 9 and 10 show an example of recording the clear cart process. In FIG. 9, there is an item 412 in the cart. In FIG. 10, user 101 has removed the item 412 from the cart, and has clicked "ClearCart" button 406D to indicate that the cart was just cleared. In at least one embodiment, the system can thereby record and identify those interactions that take place when the cart is cleared. In at least one embodiment, the cart is cleared so that the site's inventory is not artificially affected by the recording process.

Figure 11:
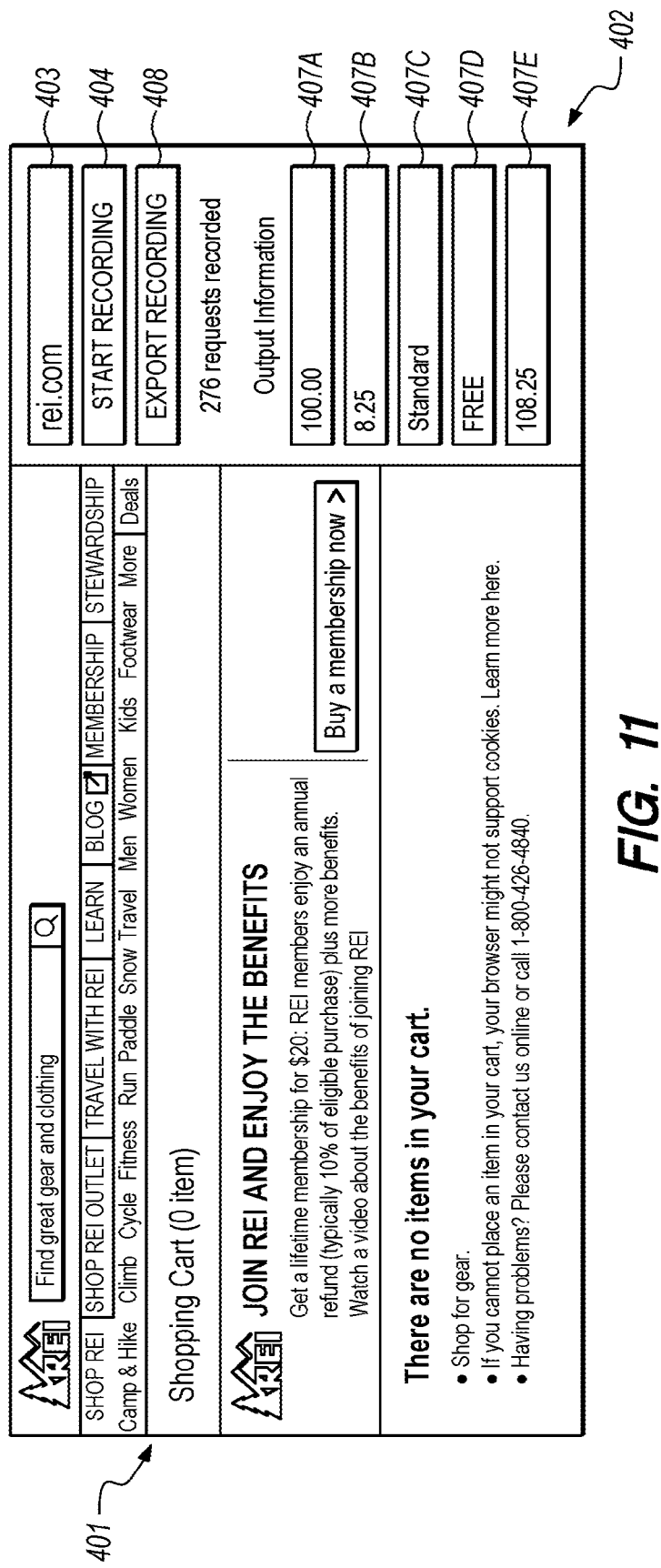

In FIG. 11, user 101 has clicked "Stop Recording" button 405. "Export Recording" button 408 has replaced "Stop Recording" button 405; clicking "Export Recording" button 408 causes the record of requests to be exported, either by saving it to local storage (such as data store 111), or by transmitting it to a server (such as server 110 or another server) for further analysis. For example, in at least one embodiment, the system stores information about interactions with web servers 109, and categorization information (whether entered by user 101 or automatically generated), on a storage device associated with server 110 or some other hardware device.

In at least one embodiment, analysis tool 117, such as a web-based application, can be used to interpret and filter the recorded results. The analysis tool can run on any client device 102, or on server 110, or on some other hardware device that has access to stored information describing user interactions with web pages. FIG. 12 depicts an example of a user interface 1200 for such an analysis tool, which may be used to identify requests generated from a recording, and rewrite the requests to allow for dynamic data, such as a new address or different coupon code. User 101, who may be a website administrator or other individual, can use analysis tool 117 to choose a file containing recorded interactions, load in a request, perform searches, and apply various filters. Examples include the following:

Filter buttons

Analytics: filters out analytics requests, such as those used for monitoring traffic to ecommerce sites.

Assets: removes all images, CSS, and the like.

Scripts: removes JavaScript files and the like.

Customer tags: removes any requests that do not include information entered by user 101, such as address, name, ZIP code, and the like.

Request tags: removes ATC tag or clear cart tags

Figure 13:
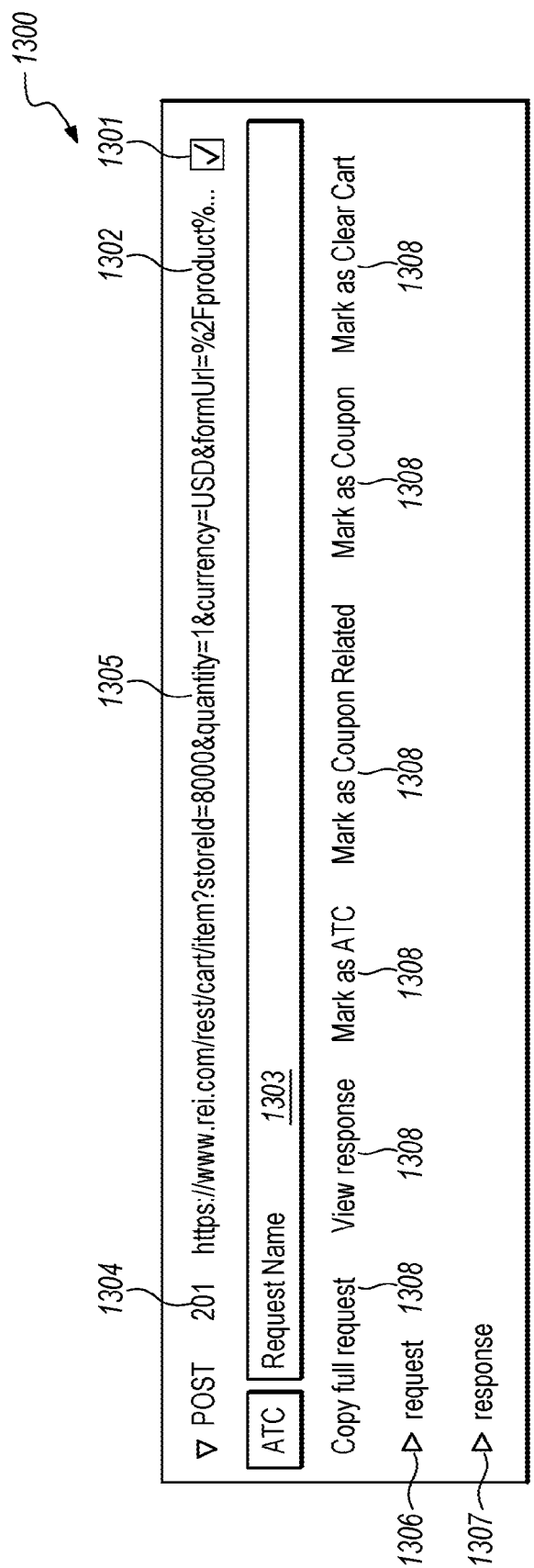
FIG. 13 depicts an example of a request as viewed via an analysis tool according to one embodiment.

Output tags: removes requests that do not include output information such as subtotal, total, tax, and the like Filter request field: allows user 101 to remove requests that include particular text Find request field: allows user 101 to view requests that include particular text Find response field: allows user 101 to view responses that include particular text Referring now to FIG. 13, there is shown an example of a user interface 1300 displaying request 1302 as viewed via analysis tool 117. Request 1302 can be named in field 1303, if desired, for ease of reference. Check box 1301 indicates that request 1300 has been selected for export. A response code of "201" is indicated 1304, along with the URL 1305 that the response was posted to. User 101 can expand the display by clicking on triangles 1306 and 1307 next to the words "request" and "response", respectively, so as to cause the corresponding information to be shown.

User 101 can also click on various links/buttons 1308, such as "Copy full request", "View Response", etc. to cause the display of every request that took place up to a certain point as identified by the button 1308 user 101 clicks on. When user 101 expands one of the groups by clicking on a button 1308, analysis tool 117 displays a list of requests for that group, filtered based on whatever current filter is applied.

Figure 14:
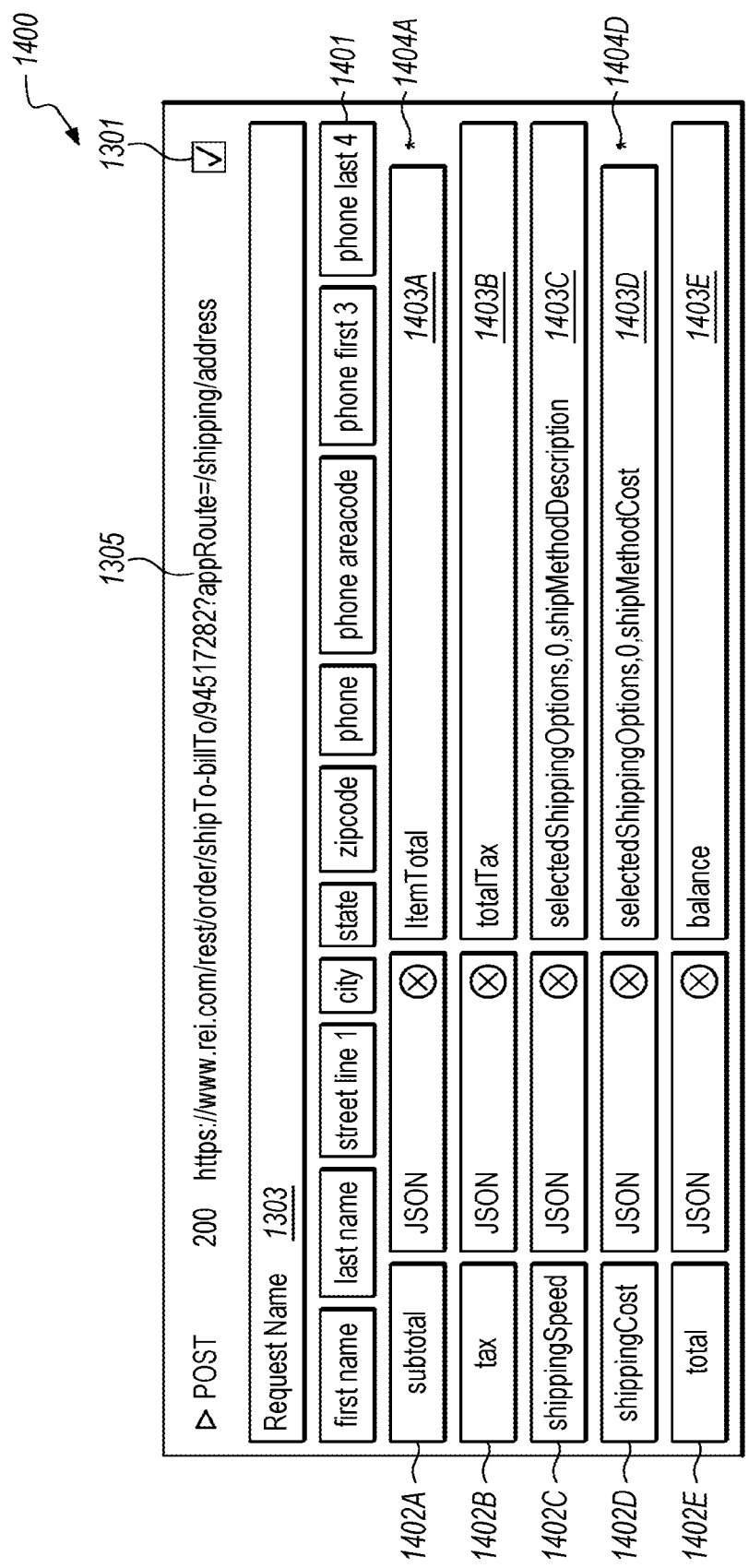
FIG. 14 depicts a screen within an analysis tool, for reviewing, extracting, and mapping information from a request, according to one embodiment.

Referring now to FIG. 14, there is shown a screen 1400 within analysis tool 117, for reviewing, extracting, and mapping information from a request. Boxes 1401 indicate information that has been automatically extracted and determined to be present in the request. Once the information has been so identified, it can be automatically replaced with any desired values before submitting an automated request.

FIG. 14 also shows how web server 109 is encoding the information, so that the automated request can include information encoded in the same way. Boxes 1402 represent user-created labels for data that is known to be part of the response. User 101 can select boxes 1402 to view information about that part of the response; this causes the display of a path to the field 1403 that has the same value. In the displayed example, these fields 1403 are JSON fields. For example, if user 101 clicks "subtotal" box 1402a, the system generates and displays the path for that field 1403. In at least one embodiment, the information for each of these fields 1403 is entered during checkout, as described above. Because the information is entered during the recording process, it can be automatically extracted by analysis tool 117. Specifically, analysis tool 117 is able to determine which value is associated with which field, so that it can generate a path to the value that maps to the key. If the automatically generated paths are incorrect, they can be adjusted manually.

Some fields 1403 are indicated by asterisks 1404 (in this example, the subtotal field 1403A and shippingCost field 1403D). This means the field 1403 contains a string that includes the data entered by user 101, but is not an ex-act match for the entered data.

Figure 15:
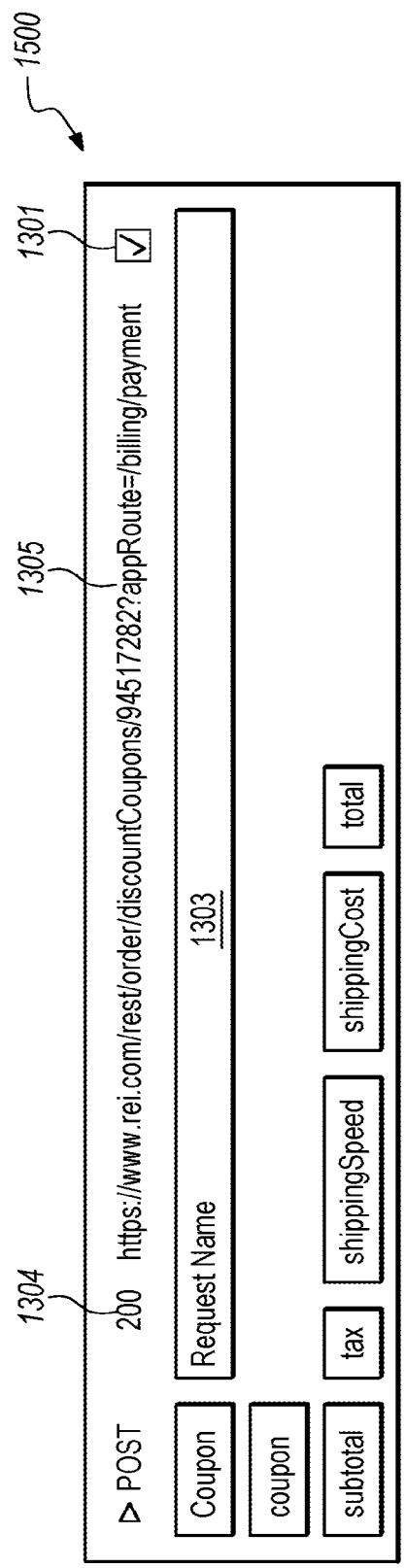
FIG. 15 depicts a screen within an analysis tool, for displaying particular extracted data for a field (in this case, a coupon field), according to one embodiment.

Referring now to FIG. 15, there is shown a screen 1500 within analysis tool 117, for displaying particular extracted data for a field (in this case, a coupon field). A coupon was entered; user 101 can mark the corresponding field as a "coupon" field. If multiple coupons have been entered, the request may be run multiple times. In this manner, the coupon request can be included or excluded when the checkout process is replayed. Since the system is able to determine what coupon was entered during checkout, it can automatically identify the request that contains the coupon value as part of the sent data.

Figure 16:
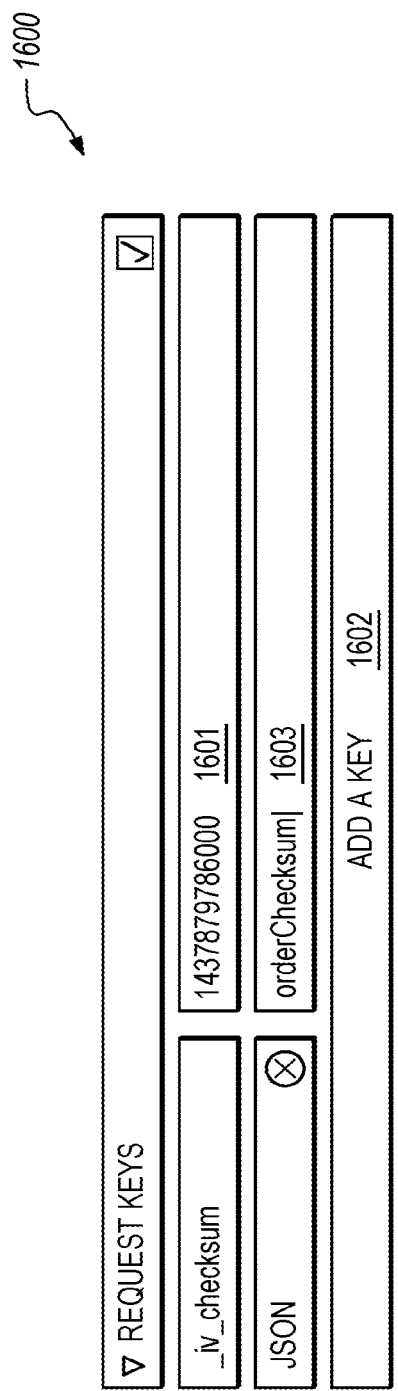
FIG. 16 depicts a screen within an analysis tool, for displaying a request key.

Referring now to FIG. 16, there is shown a screen 1600 within an analysis tool, for displaying a request key. Here, the 13-digit number is a key 1601 that is necessary to make one of the requests at the website run by web server 109. Various web servers 109 may generate key 1601 in different ways, either as a checksum, or security token, or the like. Typically, such keys 1601 may last for the duration of a session, or they may be generated anew for each request.

In at least one embodiment, analysis tool 117 identifies such keys 1601, and looks for input values that generate particular keys 1601. The appropriate key 1601 for an input value can then be copied and added (using "Add a key" button 1602). Subsequently, analysis tool 117 looks thru all requests, and replaces all instances of the key with a variable name (such as "_iv_checksum").

Analysis tool 117 also looks thru previous requests to see where that value came from. In this case, analysis tool 117 determines that the value came from a previous request in a field called orderChecksum 1603. This allows the system to make the association between the orderChecksum field 1603 and the variable_iv_checksum. Specifically, when it sees a response that includes orderChecksum, the system extracts the value, assigns it to the variable _iv_checksum, and then substitutes it where appropriate. Additionally, in at least one embodiment, the_iv_checksum variable is auto-assigned a value from the previous request, and future requests use the auto-assigned value. In this manner, information can be automatically mapped from one request to the next.

In at least one embodiment, the system can handle several different request keys 1601 from different sources, so that it can determine what information is needed from the different sources, and what requests are required.

In at least one embodiment, the system can also detect changes to the website, because the returned data is not what is expected. In such a situation, the system can alert user 101 that further analysis is needed to re-associate variables, request keys 1601, values, and the like, in view of the new website architecture. One example of this is an "out of stock" message. In such a situation, web server 109 may respond with an error that can be parsed and mapped to an "out of stock" error format that is then automatically reported by the system.

Identifying Requests 203

Once the process flow has been completed and all requests have been recorded and saved, the request identification module 118 reviews the recorded requests and identifies requests 203 that are necessary to complete the process flow. In at least one embodiment, request identification module 118 keeps track of the sequence for such requests, so that they can be run in the correct order. In many cases, this sequence is critical, as the response of one request can be used in the header of a subsequent request.

Cookies often come back in the response from requests. In at least one embodiment, request identification module 118 determines which cookies are necessary to make a request, and further determines where these cookies are generated. In some cases, a cookie comes back as a set-cookie in the response header, and in other cases it may come back in the response body. If the cookie is in the response body, request identification module 118 parses it and then uses that information to set the cookie when making its own requests.

Request identification module 118 likewise processes other data in a request, such as post data or query strings. Request identification module 118 identifies the request being made, as well as the parts of the request that need to be substituted with session-specific data. In at least one embodiment, the system has input a unique value when recording session data, so that request identification module 118 can review prior requests for a particular data item and thereby determine where it originated. After determining where it originated, a parser can be generated to automatically grab the value and set that value on future requests. In that case, both requests are used to complete the flow.

In at least one embodiment, the system swaps out input data when making new requests, in order to complete the flow with the correct inputs. In order to do so accurately, request identification module 118 determines how the site handles encoding, and ensures that the input data matches the site's encoding scheme. FIG. 12 depicts an example user interface 1200 for a tool for identifying requests according to one embodiment. This tool is used for both analysis and rewriting of the requests to support dynamic data. FIG. 12 illustrates the ability to filter requests, expand requests that were captured during various parts of the checkout flow, such as during an add to cart event, while pricing is available on the screen, while a coupon code is being applied, and while the cart is being cleared. The ability to export the identified requests is possible, once requests have been identified and selected.

Rewriting 204 and Executing 205 Requests

Once all of the requests have been identified and rules have been generated to swap the necessary inputs and outputs from one request to the next, automated site navigation module 116 can rewrite 204 and execute 205 requests to complete process flow. In at least one embodiment, the rewriting step 204 can be performed by automated site navigation module 116; alternatively, it can be performed by any other component of the system.

In at least one embodiment, automated site navigation module 116 executes requests in virtually any suitable context that allows for requests and responses to be handled manually. In at least one embodiment, the system uses a browser extension that can run in a headless browser, or within a standard browser that support extensions and the ability to manipulate cookies. Alternatively, requests can be executed without the use of a browser, such as through a server based node process. This allows the module to run server side or client side.

In at least one embodiment, when executing requests, automated site navigation module 116 maintains control of both the request data and response data. Often, sites will respond with a "302" error message, which signals for a new request to be made at a different location. In at least one embodiment, automated site navigation module 116 follows redirects in order to successfully complete certain flows.

In at least one embodiment, automated site navigation module 116 is configured to properly process request-response content, such as a set-cookie response which signals the cookie to be updated before sending the next request.

In at least one embodiment, automated site navigation module 116 records responses that can be passed to the next request, so as to rewrite the request appropriately before sending it. Responses may be in any suitable format, such as a HTML, JSON, plain text, compressed data, or the like. In at least one embodiment, automated site navigation module 116 is configured so that it can parse responses in whatever format they appear, so as to extract the necessary output values.

In some embodiments, automated site navigation module 116 can be configured to enable parallel execution of multiple requests, in order to speed up execution. It may be that a few requests can run in parallel and their combined output is necessary for the following request. Automated site navigation module 116 may be configured to take such rules into account, so that it is capable of coordinating such parallel processing.

In at least one embodiment, once execution is complete, automated site navigation module 116 cleans up and resets in order to run future flows.

Applications

As mentioned above, the described techniques can be used in many different contexts, including e-commerce as well as other domains. For example, the techniques can be used in any situation for automated navigation of a website-based process, particularly when multiple requests are to be performed in a specified sequence in order to obtain desired information. The described system and method thus provide an efficient, generalized approach for performing automated web-based processing in an efficient manner.

In one example, the system can be used for automated navigation of web-enabled processes related to products, travel, lodging, automobile shopping, and/or the like, from any number of disparate sources.

The present system and method have been described in particular detail with respect to possible embodiments. Those of skill in the art will appreciate that the system and method may be practiced in other embodiments. First, the particular naming of the components, capitalization of terms, the attributes, data structures, or any other programming or structural aspect is not mandatory or significant, and the mechanisms and/or features may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrases "in at least one embodiment" or "in at least one embodiment" in various places in the specification are not necessarily all referring to the same embodiment.

Various embodiments may include any number of systems and/or methods for performing the above-described techniques, either singly or in any combination. Another embodiment includes a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within the memory of a computing device. These algorithmic descriptions and representations are the means used by those skilled in the data processing arts to most effectively con-vey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions can be embodied in software, firmware and/or hardware, and when embodied in software, can be downloaded to reside on and be operated from different platforms used by a variety of operating systems.

The present document also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. The program and its associated data may also be hosted and run remotely, for example on a server. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the system and method are not described with reference to any particular programming language. It will be appreciated that a variety of programming languages may be used to implement the teachings described herein, and any references above to specific languages are provided for disclosure of enablement and best mode.

Accordingly, various embodiments include software, hardware, and/or other elements for controlling a computer system, computing device, or other electronic device, or any combination or plurality thereof. Such an electronic device can include, for example, a processor, an input device (such as a keyboard, mouse, touchpad, track pad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or non-portable. Examples of electronic devices that may be used for implementing the described system and method include: a desktop computer, laptop computer, television, smartphone, tablet, music player, audio device, kiosk, set-top box, game system, wearable device, consumer electronic device, server computer, and/or the like. An electronic device may use any operating system such as, for example and without limitation: Linux; Microsoft Windows, available from Microsoft Corporation of Redmond, Wash.; Mac OS X, available from Apple Inc. of Cupertino, Calif.; iOS, available from Apple Inc. of Cupertino, California; Android, available from Google, Inc. of Mountain View, Calif.; and/or any other operating system that is adapted for use on the device.

While a limited number of embodiments have been described herein, those skilled in the art, having benefit of the above description, will appreciate that other embodiments may be devised. In addition, it should be noted that the language used in the specification has been principally selected for readability and instructional purposes, and may not have been selected to delineate or circumscribe the subject matter. Accordingly, the disclosure is intended to be illustrative, but not limiting, of scope.

What is claimed is:
1. A computer-implemented method on a client device for automatically navigating a website, comprising:
  obtaining an encoding scheme of a web server based on recording interactions with a website, the encoding scheme indicating:
    a request containing a first data, and
    a key to swap the first data in the request, so that the encoding scheme can be used for future requests;
  generating a first rewritten network request based on the encoding scheme, the first rewritten network request including first substitute data in place of the first data by inserting the first substitute data for the key in the request, the first rewritten network request being used to change an input information;
  executing the first rewritten network request based on the encoding scheme;
  generating a second rewritten network request based on the encoding scheme, the second rewritten network request including second substitute data in place of the first data by inserting the second substitute data for the key in the request, the second rewritten network request being used to change a coupon; and executing the second rewritten network request based on the encoding scheme.

2. The computer-implemented method of claim 1, wherein the executing the first rewritten network request or the second rewritten network request includes transmitting the first rewritten network request or the second rewritten network request to the web server.

3. The computer-implemented method of claim 1, further comprising, prior to generating the first rewritten network request or the second rewritten network request, identifying network requests of a plurality of network requests necessary to complete a web-based operation.

4. The computer-implemented method of claim 3, wherein the web-based operation includes displaying a plurality of web pages.

5. The computer-implemented method of claim 3, wherein the web-based operation includes a web-based purchase.

6. The computer-implemented method of claim 3, wherein each network of the plurality of network requests includes a communication between the client device and the web server.

7. The computer-implemented method of claim 1, wherein the executing the first rewritten network request or the second rewritten network request includes automatically executing the first rewritten network request or the second rewritten network request without using a browser.

8. The computer-implemented method of claim 1, wherein the executing the first rewritten network request or the second rewritten network request includes automatically executing the first rewritten network request or the second rewritten network request without rendering results for display.

9. The computer-implemented method of claim 1, wherein the executing the first rewritten network request or the second rewritten network request includes automatically executing the first rewritten network request or the second rewritten network request without human interaction.

10. The computer-implemented method of claim 1, further comprising extracting information from a response of the website in response to receiving the response to the first rewritten network request or the second rewritten network request.

11. A non-transitory computer-readable medium storing instructions that, when executed by a processor on a client device, cause the processor to perform a method for automatically navigating a website, the method comprising:
   obtaining an encoding scheme of a web server based on recording interactions with a website, the encoding scheme indicating:
     a request containing a first data, and
     a key to swap the first data in the request, so that the encoding scheme can be used for future requests;
   generating a first rewritten network request based on the encoding scheme, the first rewritten network request including first substitute data in place of the first data by inserting the first substitute data for the key in the request, the first rewritten network request being used to change an input information;
   executing the first rewritten network request based on the encoding scheme;
   generating a second rewritten network request based on the encoding scheme, the second rewritten network request including second substitute data in place of the first data by inserting the second substitute data for the key in the request, the second rewritten network request being used to change a coupon; and
   executing the second rewritten network request based on the encoding scheme.

12. The non-transitory computer-readable medium of claim 11, wherein the method further comprises, prior to the generating the first rewritten network request or the second rewritten network request, automatically identifying network requests of a plurality of network requests necessary to complete a web-based operation.

13. The non-transitory computer-readable medium of claim 12, wherein the web-based operation includes displaying a plurality of web pages.

14. The non-transitory computer-readable medium of claim 12, wherein the web-based operation includes a web-based purchase.

15. The non-transitory computer-readable medium of claim 12, wherein each network request of the plurality of network requests includes a communication between the client device and the web server.

16. The non-transitory computer-readable medium of claim 11, wherein the executing the first rewritten network request or the second rewritten network request includes automatically executing the first rewritten network request or the second rewritten network request without using a browser.

17. The non-transitory computer-readable medium of claim 11, wherein the executing the first rewritten network request or the second rewritten network request includes automatically executing the first rewritten network request or the second rewritten network request without rendering results for display.

18. The non-transitory computer-readable medium of claim 11, wherein the executing the first rewritten network request or the second rewritten network request includes automatically executing the first rewritten network request or the second rewritten network request without human interaction.

19. The non-transitory computer-readable medium of claim 11, wherein the method further comprises automatically extracting information from a response of the website in response to receiving the response to the first rewritten network request or the second rewritten network request.

20. A system for automatically navigating a website, comprising:
   a memory storing instructions; and
   a processor executing the instructions to perform a process based on recording interactions with a website, the process including:
     obtaining an encoding scheme of a web server, the encoding scheme indicating:
       a request containing a first data, and
       a key to swap the first data in the request, so that the encoding scheme can be used for future requests;
     generating a first rewritten network request based on the encoding scheme, the first rewritten network request including first substitute data in place of the first data by inserting the first substitute data for the key in the request, the first rewritten network request being used to change an input information;
     executing the first rewritten network request based on the encoding scheme;
     generating a second rewritten network request based on the encoding scheme, the second rewritten network request including second substitute data in place of the first data by inserting the second substitute data for the key in the request, the second rewritten network request being used to change a coupon; and executing the second rewritten network request based on the encoding scheme.

\* \* \* \* \*